March 20, 1962   G. PATTANTYUS   3,025,607
DEVICE FOR MEASURING THE LENGTH OF COILS OF STRIP
Filed May 11, 1960   2 Sheets-Sheet 1

Inventor
GEORG PATTANTYUS

By Toulmin & Toulmin
Attorneys

March 20, 1962 G. PATTANTYUS 3,025,607
DEVICE FOR MEASURING THE LENGTH OF COILS OF STRIP
Filed May 11, 1960 2 Sheets-Sheet 2

Inventor
GEORG PATTANTYUS

By Toulmin & Toulmin
Attorneys 3,025,607
DEVICE FOR MEASURING THE LENGTH OF COILS OF STRIP
Georg Pattantyus, Av. Joao XXI-12-16 D°, Lisbon, Portugal
Filed May 11, 1960, Ser. No. 28,467
4 Claims. (Cl. 33—127)

The present invention relates to an apparatus for measuring the lengths of strips wound up in a coil, more particularly, to such strips having non-uniform thicknesses.

It has been known to provide devices for measuring coils of strips of uniform thickness. Such devices may be used, for example, in measuring the length of tape in recording and play-back apparatus in order to determine the total length of a tape that is wound up in a coil as well as to find quickly certain areas of the tape intermediate the ends thereof. These devices also serve for determining the location of such an area on the tape in terms of units of length.

In practice, however, the thickness of such sound recording tapes is not always uniform. Where it is necessary to make precise measurements in terms of lengths of the tape, even the smallest variation of thickness will lead to inaccurate measurements. In addition, the coiling of the tape on a reel is not always carried out in the same manner. In some instances the tape is coiled relatively tightly whereas in other cases it is coiled relatively loosely. In general, sound tapes are coiled relatively loosely.

While the invention is directed to the coiling of sound recording tapes, it is not limited to this field. This invention can be used anywhere in measuring any strips, tapes, or sheet material having either uniform or non-uniform thickness and it is desired to roll this material into a coil.

Known devices for measuring the lengths of coiled material have been rather complicated and have usually employed sensitive gearing transmission units which give rather inaccurate results. In some cases only partial results are obtained from which the desired final results can be obtained in a complicated manner only through the use of various tables, diagrams or the like.

In order to correct the inaccuracies in measuring a length of coil material a new factor must be considered. This factor is a change in diameter of the coiled strip which is occasioned both by the thickness of the material being coiled and by the manner in which the material is being coiled loosely or tightly. It is apparent that when winding a strip of a particular length which may be described as having a thin thickness, the resulting coil material has more windings than in the case of a similar strip having a greater thickness. The diameter, however, of the coiled strip having the thin thickness is smaller than in the case of the coil of the material having the greater thickness. Having these characteristics in mind, it is possible to construct a device which takes these factors into consideration and provides accurate measurements of the length of a coil of strip material regardless of variations in the thickness thereof, or the manner in which the strip material is wound.

The present invention essentially comprises a disc which is driven by the reel upon which the strip is being wound or by a driving device for the reel. An axially displaceable wheel is mounted on a shaft in spaced relation to the disc. The wheel is rotated by rotation of the disc and is concurrently displaced radially outwardly along the shaft. This wheel also drives the shaft on which it is mounted and the shaft is connected with indicating means. The indicating means may be any one of a number of known structures such as, for example, a counting device having an indicating hand in connection with a calibrated scale or the like on which the units of length can be read directly in each case.

The surface of the disc has a number of perforations or bores evenly spaced from each other and positioned in a curve which is of a spiral shape. Cone-shaped projections are mounted on the displaceable wheel evenly spaced from one another and are adapted to engage the bores of the disc. As a result a wheel having these projections is continuously moved radially outwardly dependent on the inclination of the spiral curve of the bores in the disc during operation of the apparatus. The mechanism for driving or rotating the disc is responsive jointly to the rotation of the reel of the strip and to the radius of the strip which is wound upon the reel. This driving mechanism comprises a shaft which is axially movable in response to the amount of strip material wound upon the reel. This shaft is drivingly connected to the mechanism on which the reel is mounted and is rotated together with the rotation of the reel. Both the axial and rotary movements of the shaft are then transmitted through a driving arrangement to the disc.

In one embodiment of the invention a shaft having the wheel with the pointed projections actuates the rotatable hand which moves across the calibrated scale. The hand is actuated from the wheel shaft by means of a gear transmission.

In order to return the apparatus to its initial or starting position, the driving disc is mounted for retraction into a corresponding recess in the base or casing of the apparatus. As a result it is possible to disengage the connection between the disc driving mechanism and the disc as well as the connection between the disc and the wheel having the projections. The wheel can then be returned to its innermost position to re-engage the perforations or bores along the spiral curve on the driving disc in the starting position. The disc is brought into its operating position by means of a spring and is held in this position or is lightly urged against the projection bearing wheel by a spring.

It is therefore the principal object of this invention to provide a device for measuring the lengths of strip having non-uniform thickness with great accuracy when such strips are wound up in a coil.

It is another object of this invention to provide a device for measuring the lengths of strips of non-uniform thickness which device is simple in construction and operation and economical to manufacture.

Other objects and advantages of this invention will become apparent upon reference to the accompanying description when taken in conjunction with the following drawings wherein.

Figure 1:
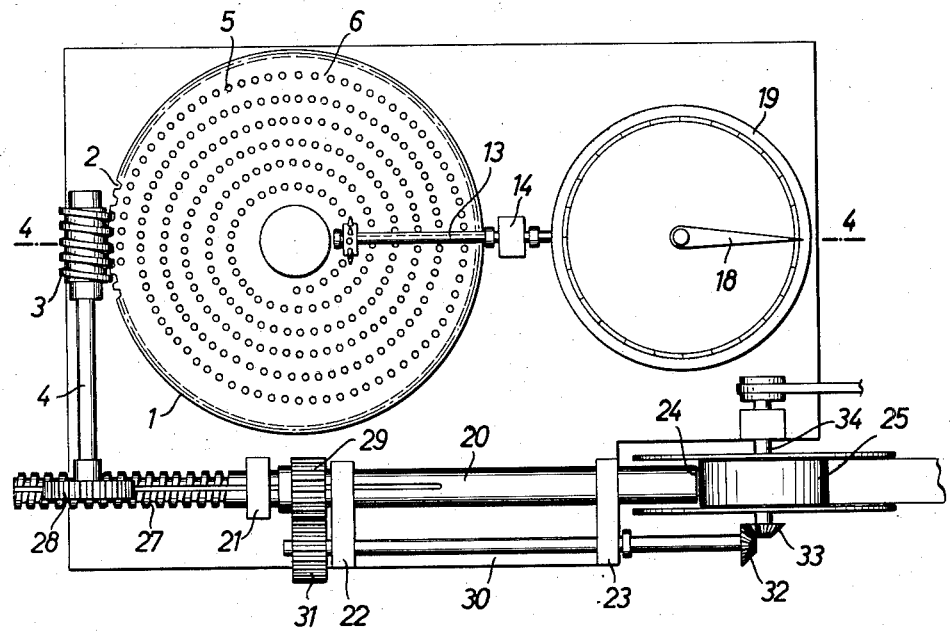
FIGURE 1 is a top plan view of the device comprising the present invention.
Figure 2:
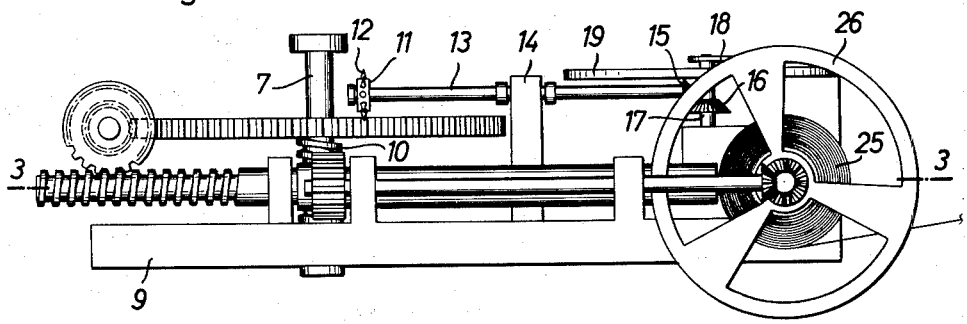
FIGURE 2 is a front elevational view of the device as illustrated in FIGURE 1.
Figure 3:
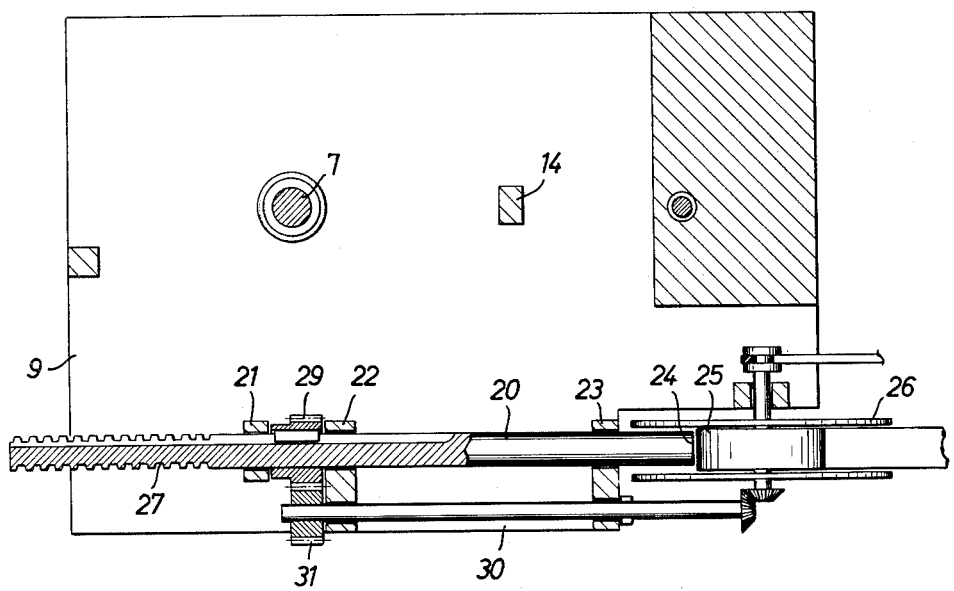
FIGURE 3 is a sectional view taken along the line 3—3 of FIGURE 2.
Figure 4:
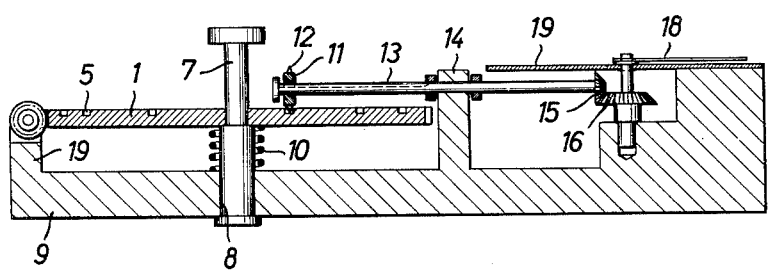
FIGURE 4 is a sectional view taken along the line 4—4 of FIGURE 1.

Returning now to the drawings, more particularly to FIGURE 1, a description of a specific embodiment of this invention will be given. The device comprises a driving disc 1 which has at the periphery thereof toothed segments or gearing 2 which is drivingly engaged with a worm 3 mounted on an actuating shaft 4. A plurality of bores or perforations 5 are arranged on the upper surface of the disc 1 beginning from an innermost position near a shaft 7 outwardly in the form of a spiral curve indicated at 6.

Disc 1 is rotatably mounted on the shaft 7 which shaft can be pressed downwardly in an opening 8 in the base or casing structure 9 of the device.

There is a spring 10 which urges the disc 1 upwardly against a wheel 11. The wheel 11 has a plurality of cone-shaped pointed projections 12 along the periphery thereof, which projections are adapted to engage the bores 5 in the disc 1 during rotation and accordingly displace the wheel 11 radially outwardly with respect to the disc 1. The wheel 11 is mounted for sliding movement on one end of a shaft 13 which in turn is rotatably mounted in a bearing 14 upstanding from the base 9 of the device.

Wheel 11 is non-rotatably mounted by a keyway upon the shaft 13 so that rotation of the wheel will cause the shaft 13 to rotate. At the other end thereof the shaft 13 has a bevel gear 15 which engages a second bevel gear 16 mounted on a shaft 17; an indicator pointer 18 is mounted upon the shaft 17 for rotation over a calibrated scale 19.

By exerting downward pressure on the shaft 7 the disc 1 can be lowered into a recess 19 against the pressure of the spring 10 and accordingly the cone-shaped projections 12 on the wheel 11 are disengaged from the bores 5 on the disc 1.

The driving mechanism for rotating the disc 1 in joint response to the rotation of the coil of material and the amount of strip material wound on the coil will next be described and comprises a shaft 20 which is mounted in bearing stands 21, 22 and 23 for both sliding and rotary movement. One end of the shaft indicated at 24 bears against the strip material 25 which is being wound upon a reel 26. The other end of the shaft 20 has a worm 27 which is drivingly engaged with a gear 28 mounted on the actuating shaft 4, near the pinion or spur gear 29 keyed on the shaft 20. There is a second shaft 30 mounted parallel to the shaft 20 and having a pinion gear 31 on one end thereof drivingly engaging the gear 29. On the other end of the shaft 30 is a beveled gear 32 which drivingly engages a bevel gear 33 mounted on a shaft 34 upon which the reel 26 is positioned.

The shaft 20 is so positioned that it constantly engages the strip material as it is being wound in a coil. Accordingly, even while the coil is being rotated during measurement, the shaft 20 will rotate the toothed segments 2 on the disc 1 in response to two motions: 1. The rotation of the worm gear drive 27 and 28; 2. The axial movement of the shaft 20 because of the increase in the radius of the coil strip.

As a result, the measurements of the length of the strip material are always responsive to two factors: namely, the number of rotations of the coil and the diameter of the strip as it is being wound in the coil.

Thus it can be seen that the present invention provides a device for measuring the length of strip material which is jointly responsive to the rotation of the reel upon which the strip is being wound and to the quantity of the strip material comprising the coil. The rotation of the disc will cause a rotation and displacement of the wheel 11, rotation of the shaft 13 and actuation of the pointer 18 over the calibrated scale 19. Thus, the precise length of the quantity of strip which has been coiled can be directly read on the calibrated scale.

It will also be understood that this invention is susceptible to modification in order to adapt it to different usages and conditions, and, accordingly, it is desired to comprehend such modification within this invention as may fall within the scope of the appended claims.

What is claimed is:

1. An apparatus for measuring the length of a strip wound up in a coil, and comprising a disc, a first shaft journalled for both axial and rotary movement, one end of said first shaft engaging a strip being wound in a coil, there being a worm on the other end of said first shaft, means for rotating said first shaft together with the rotation of said coil, driving means interconnecting said worm and said disc for rotating said disc at a determined ratio responsive to the rotation of the coil, a rotatable second shaft positioned radially above said disc and restrained against axial movement, a wheel non-rotatably mounted upon said second shaft and in rolling engagement with the surface of said disc so that rotation of said wheel upon said disc will cause said second shaft to rotate, said wheel being axially displaceable on said second shaft, in relation to said disc, and an indicator, said second shaft actuating said indicator for indicating the length of the strip wound on the coil of said strip.

2. An apparatus for measuring the length of a strip wound up in a coil, and comprising a disc, a first shaft journalled for sliding and rotary movement, one end of said first shaft engaging the strip being wound in a coil, there being a worm on the other end of said first shaft, a second shaft parallel to said first shaft and journalled for rotary movement, gear means on one end of said second shaft drivingly connected to the coil of strip, gear means on the other end of said second shaft and drivingly connected to said first shaft to rotate the first shaft in response to rotation of the coil, driving means interconnecting said worm on said first shaft with said disc for rotating said disc at a determined ratio, a calibrated scale having a pointer, and means being drivingly connected with said disc for moving said pointer over said calibrated scale at a ratio determined by the moving of the strip.

3. An apparatus for measuring the length of a strip wound in a coil, and comprising a disc, a first shaft journalled for both sliding and rotary movement, one end of said first shaft engaging the material wound in a coil, there being a worm on the other end of said first shaft, a spur gear keyed on said first shaft, a coil shaft for supporting the coil strip, a bevel gear on said coil shaft, a second shaft parallel to said first shaft and journalled for rotary movement, a spur gear on said second shaft drivingly engaging said first shaft spur gear, said first shaft being rotated in response to rotation of the coil and being moved axially in response to the strip wound on the coil, driving means interconnecting said first shaft worm and said disc for rotating said disc in joint response to the rotation of the coil and the radius of the strip wound thereon, a calibrated scale having a pointer, and means being drivingly connected with said disc for moving said pointer over said calibrated scale at a ratio determined by the moving of the strip.

4. An apparatus for measuring the length of a strip wound up in a coil, and comprising a disc, said disc being provided with toothed segments around the periphery thereof, a shaft journalled for both sliding and rotary movement, one end of said shaft engaging the strip wound in a coil, there being a worm on the other end of said shaft, means for rotating said shaft together with the rotation of the coil, a driving shaft having a gear on one end thereof drivingly engaged with said worm, a second worm on the other end of said driving shaft and engaging said toothed segments so that said disc rotates responsive jointly to the radius of the strip wound in a coil and the rotation of the coil, a calibrated scale having a pointer, and means being drivingly connected with said disc for moving said pointer over said calibrated scale at a ratio determined by the moving of the strip.

References Cited in the file of this patent

UNITED STATES PATENTS

| | | |
|---|---|---|
| 1,585,660 | Frampton | May 25, 1926 |
| 2,856,691 | Pattantyus | Oct. 21, 1958 |
| 2,911,161 | Proctor | Nov. 3, 1959 |